Feb. 22, 1966 J. G. LEVRATTO 3,236,324
VEHICLE WITH EXTENDABLE WHEELS
Filed Jan. 13, 1964 10 Sheets-Sheet 2

INVENTOR.
James G. Levratto
BY
Attorneys

Fig. 3

INVENTOR.
James G. Levratto
BY *Flehr* *and* *Swain*
Attorneys

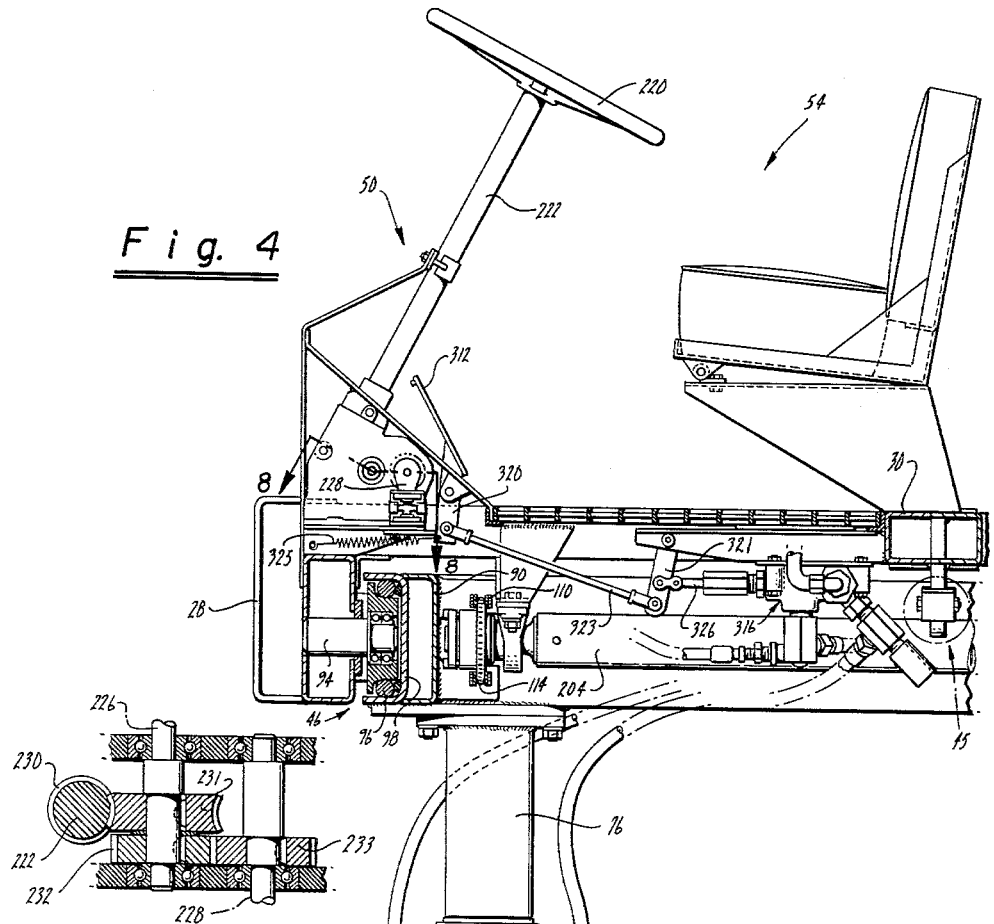
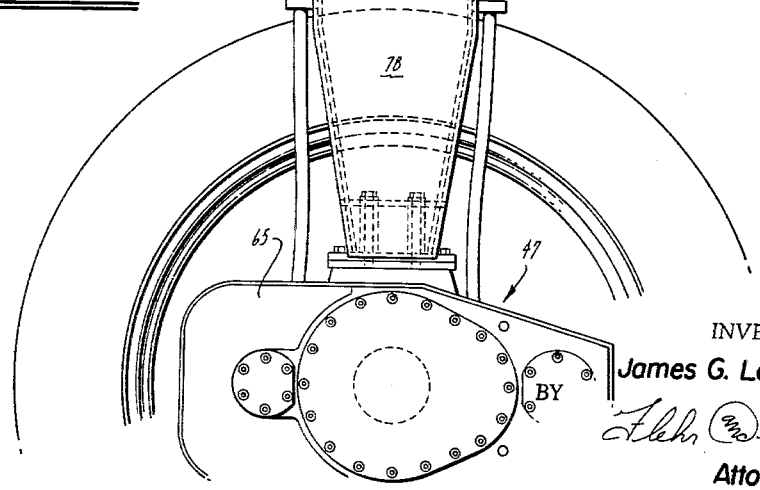

INVENTOR.
James G. Levratto

Feb. 22, 1966 J. G. LEVRATTO 3,236,324
VEHICLE WITH EXTENDABLE WHEELS
Filed Jan. 13, 1964 10 Sheets-Sheet 6
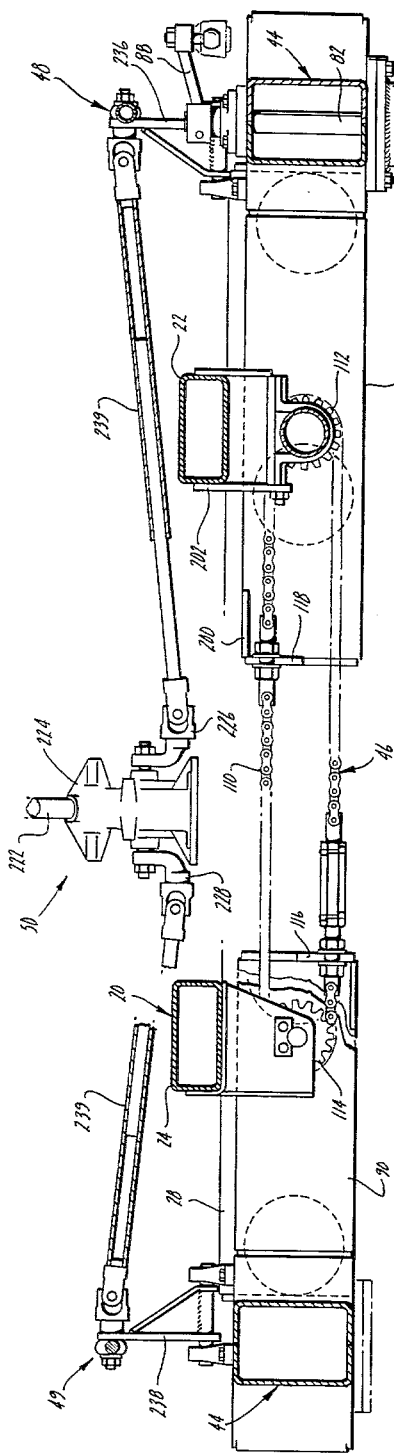
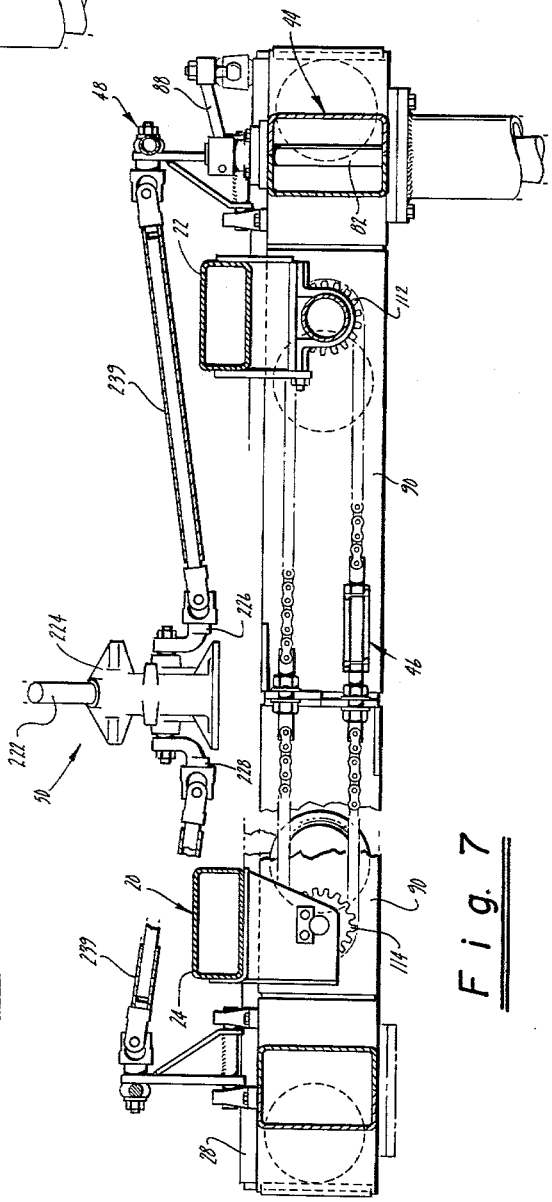
INVENTOR.
James G. Levratto
BY
Attorneys

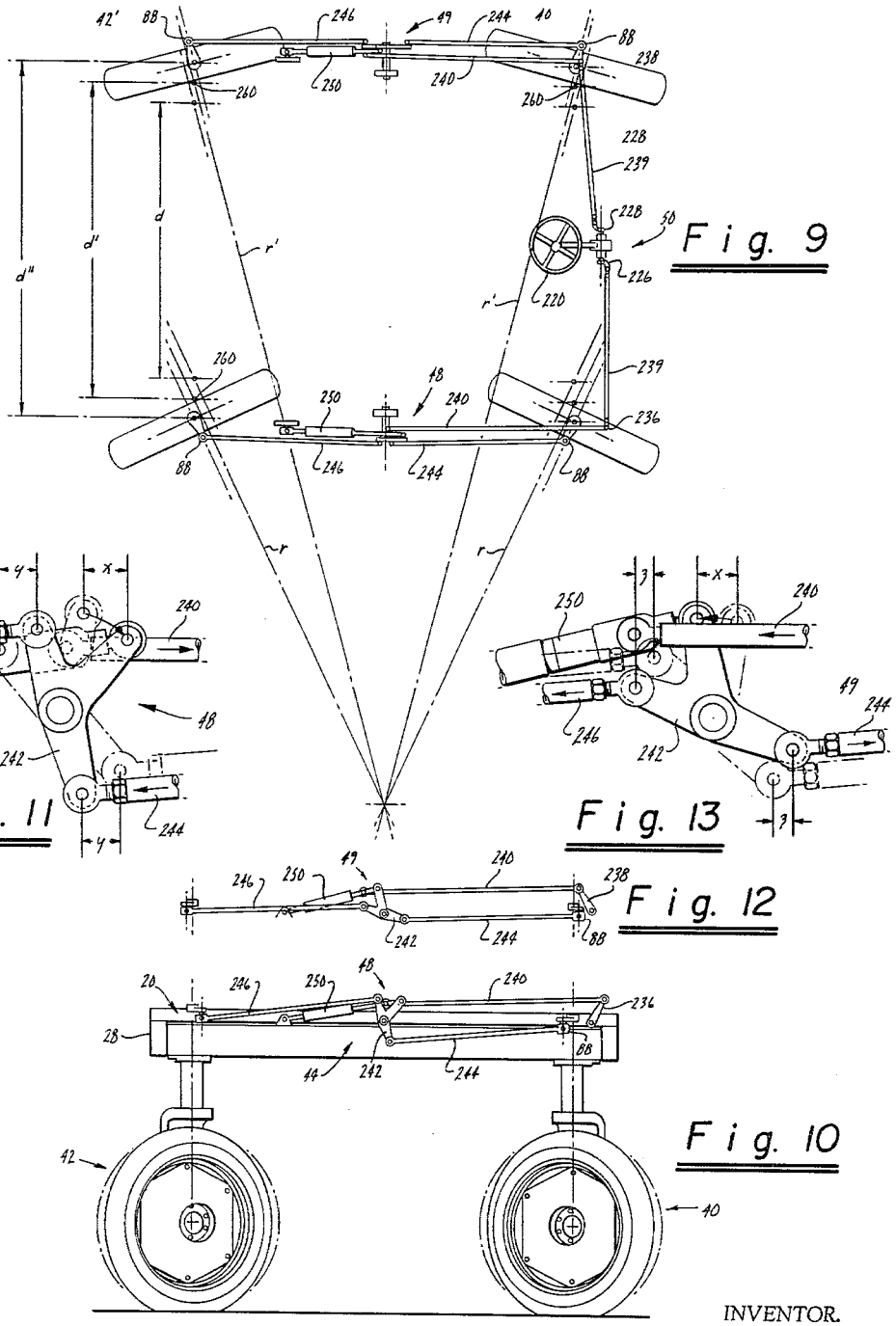

INVENTOR.
James G. Levratto
BY
Attorneys

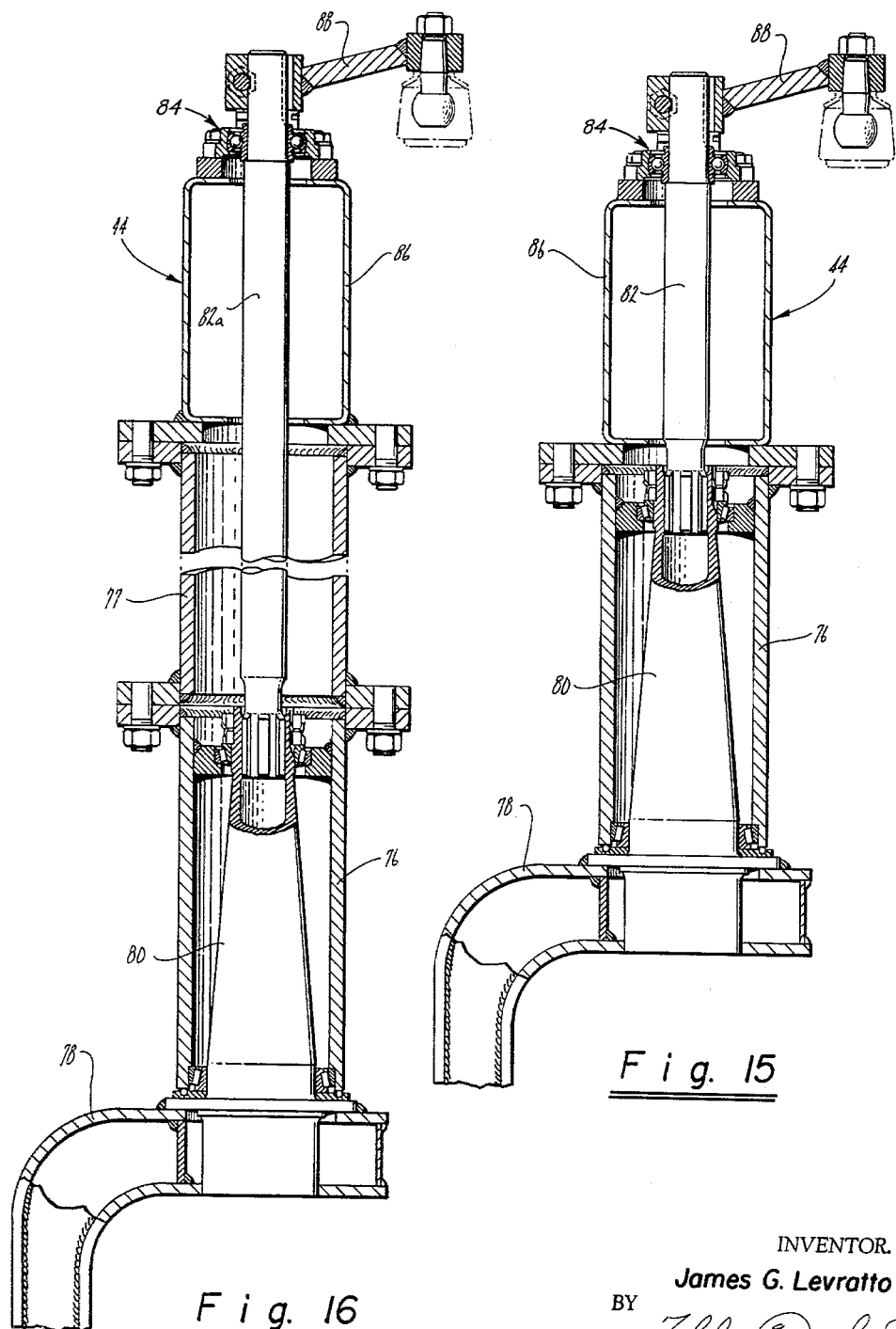

Feb. 22, 1966     J. G. LEVRATTO     3,236,324
VEHICLE WITH EXTENDABLE WHEELS
Filed Jan. 13, 1964     10 Sheets-Sheet 10

INVENTOR.
James G. Levratto
BY
Attorneys

United States Patent Office 3,236,324
Patented Feb. 22, 1966

3,236,324
VEHICLE WITH EXTENDABLE WHEELS
James G. Levratto, 596 Anza St., Mountain View, Calif.
Filed Jan. 13, 1964, Ser. No. 337,242
4 Claims. (Cl. 180—46)

This invention relates generally to improvements in wheeled vehicles, and more particularly to improvements in farm vehicles adapted to use with row crops.

In recent years there has been a definite trend to mechanize virtually all farming operations, with the result that there has been extensive development of mobile farm equipment for general farming purposes. For example, in the farming of row crops, wheeled machines of various types have been developed for planting, fertilizing, applying pesticides, harvesting, and otherwise treating the many different types of crops encountered. In carrying out these operations, the machines generally proceed along the rows of crops with the wheels straddling the plants so as to pass unobstructed between the rows. Workers and equipment are positioned on the vehicle to carry out the particular operation of the machine in the most efficient manner.

Despite the development of a number of highly successful machines for carrying out specific operations of the type described, particular machines have generally been subject to certain shortcomings. For example, different row crops such as cotton, artichokes, corn, alfalfa, etc., require planting at different spacings between the rows to make the most effective use of the land. Consequently, if a single machine is to be successfully employed with more than one crop, it is essential that means be provided for easily widening and narrowing the tread of the vehicle so that the machine can travel freely between the rows of plants. To a lesser degree, it is also desirable that the machine be adjustable in height according to the nature of the crop. An additional problem is to provide a machine which in addition to being rugged, powerful, and readily maneuverable, is adapted to a wide variety of different operations, without undue delay. To date, no effective machine has been devised which is capable of satisfying these requirements.

In general, the present invention is directed to what now appears to be a simple solution to the above and to additional problems, as will appear, and one object of the invention therefore is to provide a vehicle of the above type wherein the tread of the vehicle can be quickly and easily widened, or narrowed.

Another object of the invention is to provide a vehicle of such character in which the wheels on one side of the vehicle can be extended or retracted during the movement of the vehicle.

Another object of the invention is to provide a vehicle of such character wherein each of the wheels of the vehicle can be independently driven and steered.

A further object of the invention is to provide a vehicle of such character wherein means are provided to uniformly extend front and rear wheels on each side of the vehicle to quickly and uniformly vary the track width of the vehicle.

A further object is to provide a vehicle of such character with separate steering connections for the wheels on each side of the vehicle, wherein effective tracking and accommodation to the turning radius of the vehicle is accomplished.

A further object is to provide a vehicle of the above type which is adapted to use in a wide variety of farming operations, and to use on the highway as well as on rough terrain.

A still further object of the invention is to provide a wheeled farm vehicle of the above character that is simple in construction, rugged, and easily operated.

Further objects and advantages of the invention will be apparent from the following description of a preferred embodiment thereof, as illustrated in the accompanying drawing, in which:

FIGURE 3 is a view in top plan thereof;

FIGURE 4 is an enlarged view in section along the line 4—4 of FIGURE 3;

FIGURE 6 is a view in transverse section along the line 6—6 of FIGURE 3;

FIGURE 7 is a like view showing the parts in a retracted position of the wheels;

FIGURE 8 is an enlarged view of a detail of the steering mechanism taken along the line 8—8 of FIGURE 4;

FIGURE 9 is a schematic view in top plan illustrating the general operation of the steering mechanism;

FIGURE 10 is a like view in side elevation showing the mechanism for steering the wheels on the right side of the machine;

FIGURE 11 is an enlarged detail view of portions of the mechanism shown in FIGURE 10;

FIGURE 12 is a fragmentary view like FIGURE 10 showing the mechanism for steering the wheels on the left side of the machine;

FIGURE 13 is an enlarged detail view of portions of the steering mechanism shown in FIGURE 12;

Figure 1:
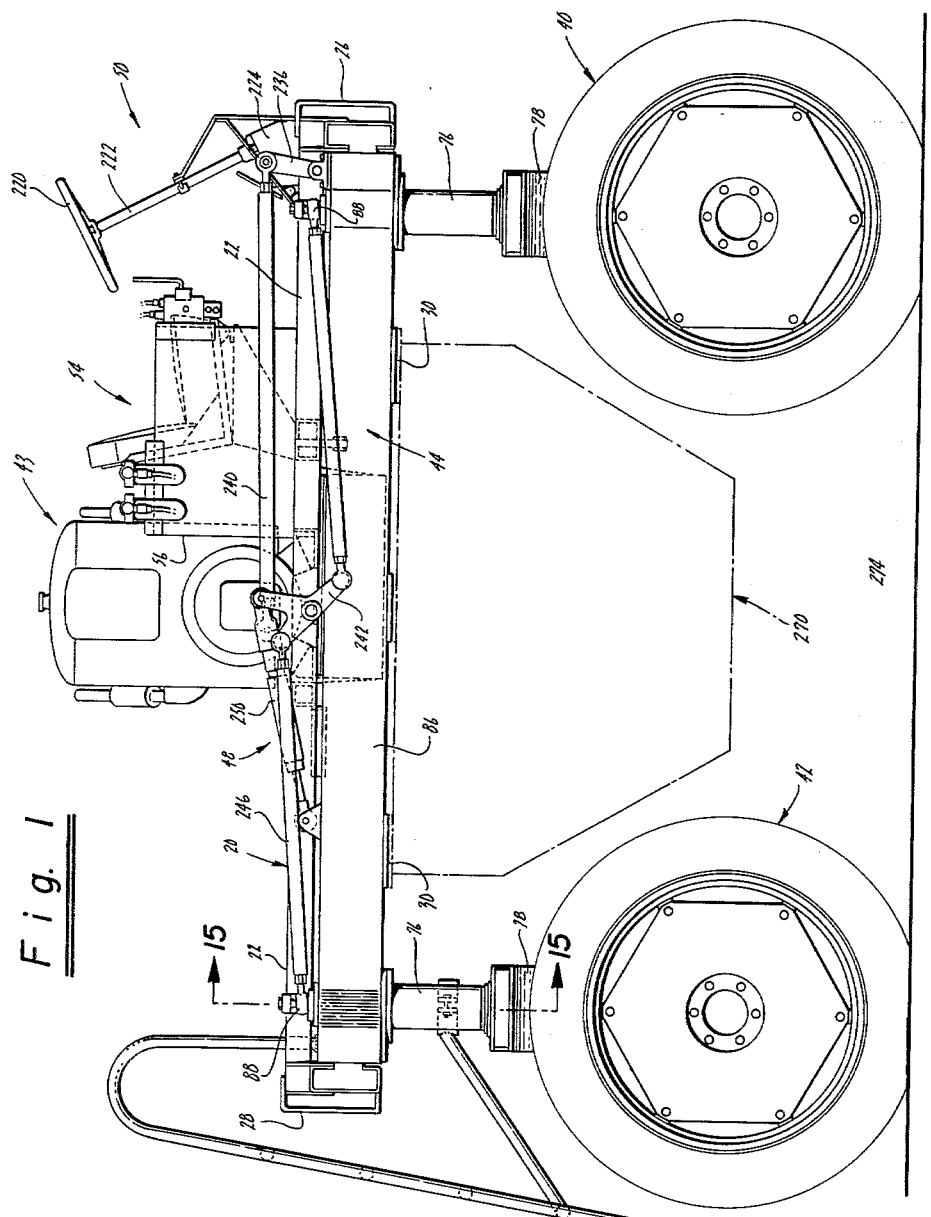
FIGURE 1 is a view in side elevation of a machine embodying the invention.
Figures 17, 18:
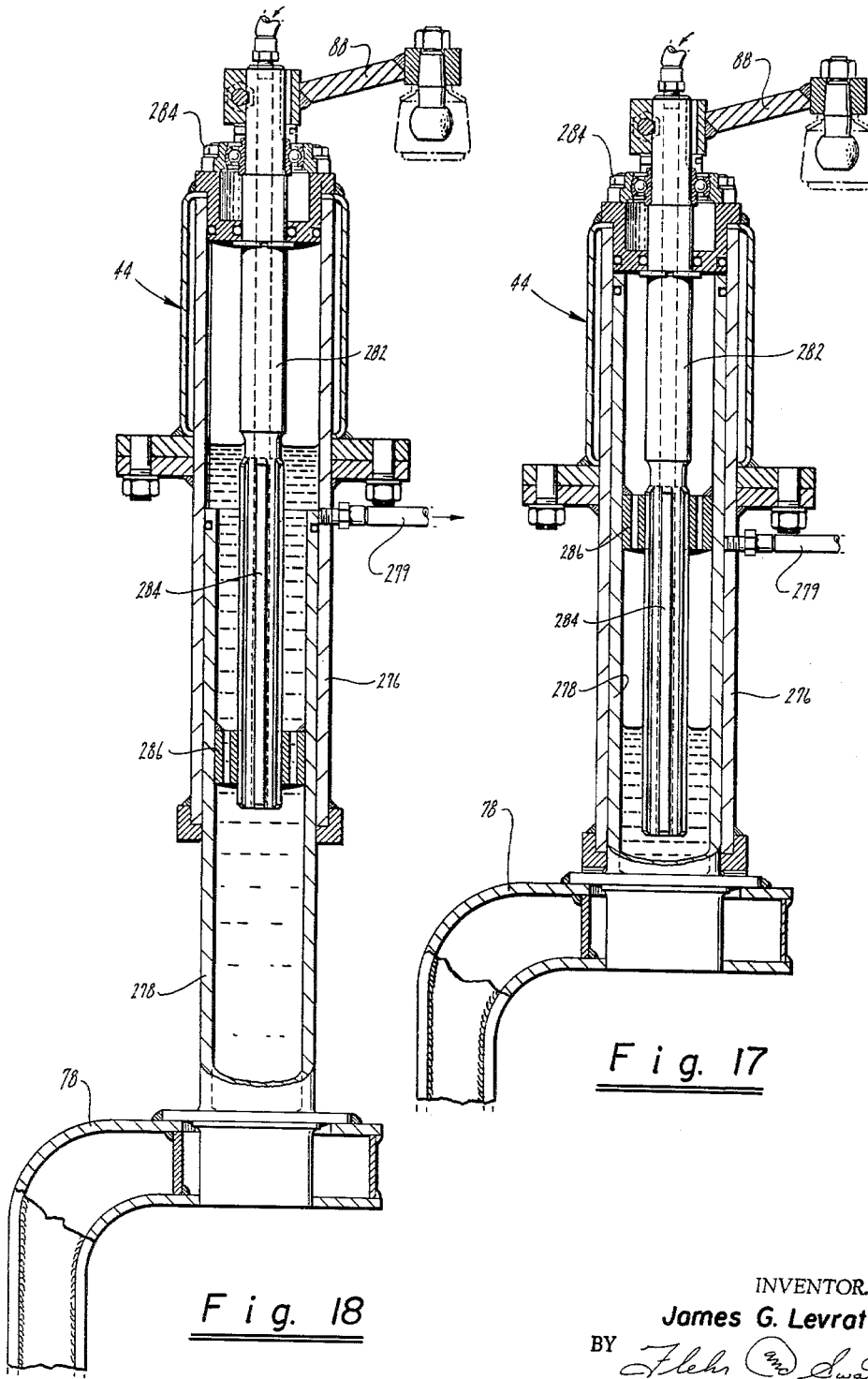

FIGURES 15 and 16 are views in vertical section along the line 15—15 of FIGURE 1, showing one technique for adjusting the operating height of the vehicle; and FIGURES 17 and 18 are like views showing modified means for adjusting the operating height of the vehicle.

In general, the wheeled vehicle of the present invention is adapted to carry out a wide variety of operations such as mechanized farming operations, where a variable track is useful or of importance. By way of illustration, the vehicle is particularly adapted to operations related to the planting, growing, and harvesting of row crops of different types (e.g., lettuce, beets, alfalfa, etc.) where the spacing between the rows of plants may vary by several feet. To this end, the vehicle is provided with subframe means by which the front and rear wheels on a side of the vehicle can be extended laterally to adjust the track width of the vehicle to the particular spacing of the row crop being farmed. For example, in one embodiment of the machine, the track of the vehicle can be readily varied during operation of the vehicle from a minimum track of about 6 feet up to a maximum track in excess of 10 feet. The individual wheels are also separately powered to provide desirable flexibility for farming operations, with each wheel being controlled from a central position on an operating platform.

In a preferred embodiment, the wheels on each side of the vehicle are linked for steering by means running fore and aft of the vehicle. These links are controlled from the operating platform to provide coupled steering of the wheels on each side of the vehicle independently of each other for effective steering control. Thus, left front and left rear wheels are steerably linked, and right front and right rear wheels are steerably linked. This steering arrangement also permits a variable turning radius of the wheels so that the inner wheels can turn on a smaller radius than the outer wheels. In such preferred embodiment, the operating platform can also be supported at an elevated position above the wheels to thereby provide a space between the wheels for mounting various types of operating equipment, such as apparatus for dusting or fertilizing crops, platforms for pickers or harvesting crews, and so on. For example, in a typical machine, the operating platform can be at an elevation of from 4 to 10 feet above the ground level.

*General Description*

The illustrated machine (FIGURES 1 to 4) generally comprises a main frame or operating platform 20 including respective side frame members 22 and 24, front and rear cross frames 26 and 28, and transverse frames 30 and plates 32 which form an upper work surface. The frame 20 is supported on front and rear wheel units 40 and 42 on either side of the machine by means of right and left subframe including side support members 44. The frame 20 serves as a support for a suitable source of propulsive power such as a gasoline or diesel engine 43. The frame also supports various operating subassemblies within the machine including cooperating extension mechanisms 45, 46 for the wheel units (FIGURES 3 and 4), right and left hand steering linkages 48, 49 for the wheel units (FIGURES 5 and 6), a main steering control 50, and an operating station 54. As will be described, an operator at the station 54 can readily effect a simultaneous extension of the wheels in a lateral direction as he steers the vehicle in any desired forward or reverse steering maneuver.

*Propulsion system*

The propulsion unit 43 operates through a series of independent drive or power units 47 associated with each of the wheel units 40, 42, and is designed for operation in conjunction with a hydraulic system employing oil, water, or other suitable liquid as the hydraulic fluid. The hydraulic fluid, which is maintained in a reservoir or tank 56 is supplied under pressure by a series of fluid pumps 58, 59 (operated by the propulsion unit 43) to the drive units 47 and to various operating cylinders of the machine, in a manner later described. The machine can also be designed to operate in conjunction with a pneumatic system in which compressed air or other gaseous fluid is employed.

Figure 2:
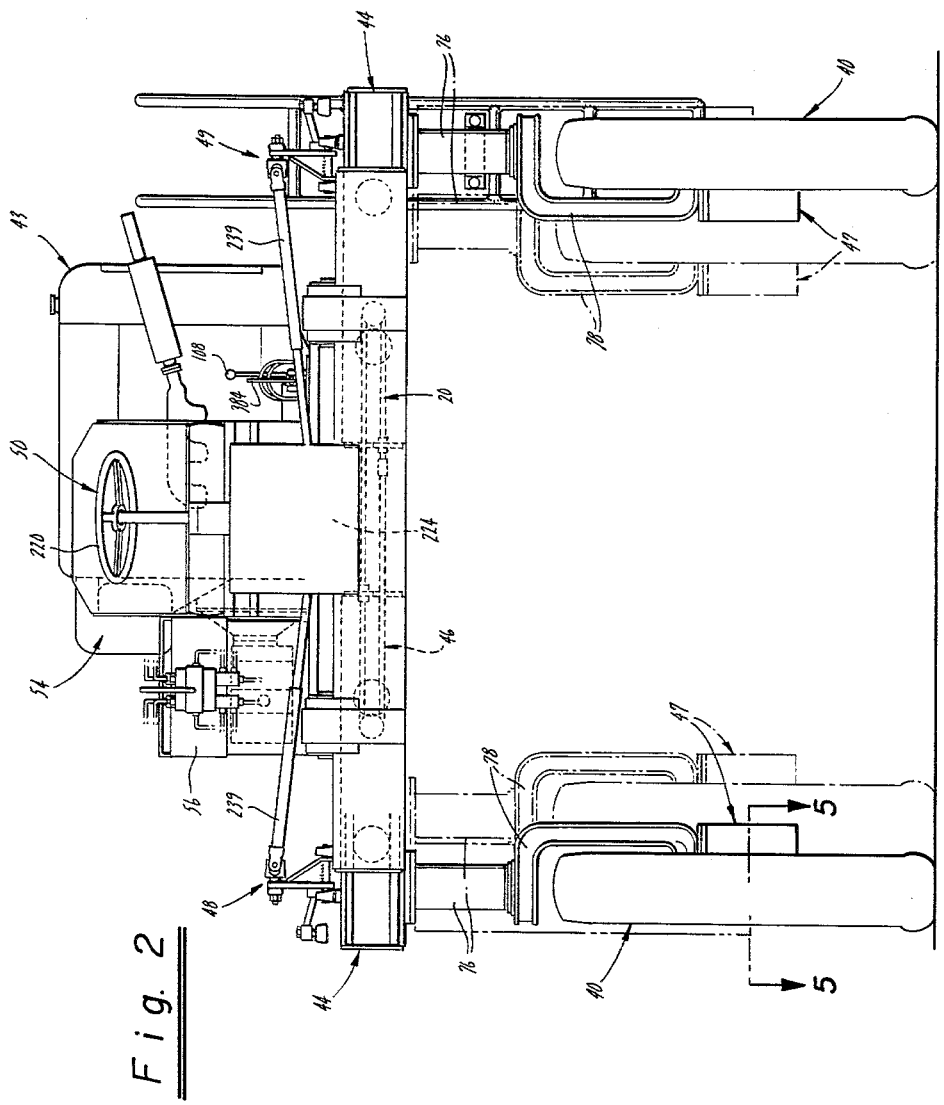
FIGURE 2 is a view in front elevation thereof showing the wheels in laterally extended position.
Figure 5:
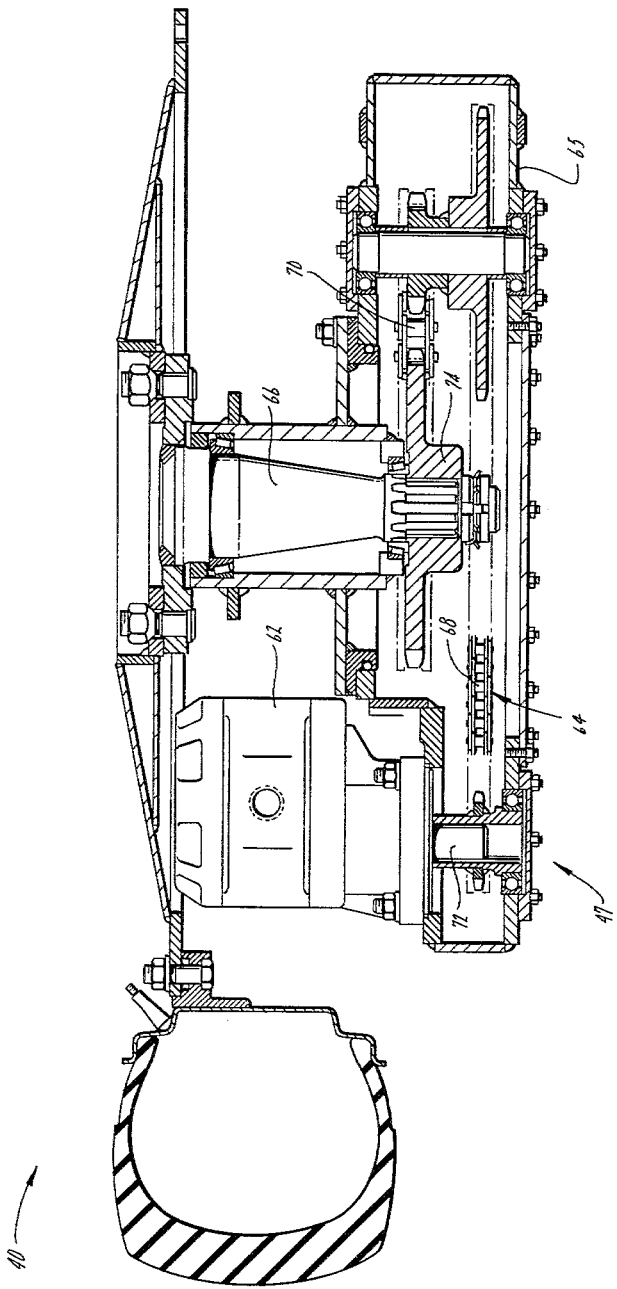
FIGURE 5 is an enlarged view in horizontal section of one of the wheel units forming part of the machine.

Referring specifically to FIGURE 5, the drive units 47 preferably employ hydraulic motors 62 which operate through appropriate power take-off and chain drive assemblies 64 to drive the wheel shafts 66 at the respective wheel units 40, 42. As illustrated, each of the drive assemblies 64 includes cooperating chain drives 68 and 70 operatively connected to the drive shaft 72 of the motor 62 and adapted to supply power to a sprocket 74 keyed to the shaft 66 of the wheel. The latter is journalled for rotation in a protective housing or gear box 65 which, in turn, is suspended from a supporting post 76 by means of a U-shaped suspension arm 72 (FIGURES 2 and 15).

*Extendable wheel support*

As generally illustrated in FIGURES 1 to 4, each of the wheel units 40, 42 supports and is rotatably received within a side support member 44. As specifically shown in FIGURE 15, the suspension arm 78 for the wheel unit is secured to a vertical steering leg 80 which, in turn, is mounted for rotation within a supporting post 76. At its upper end, each leg 80 is splined to a steering post 82 which is rotatably mounted, as at 84, on a side section 86 of one of the support members 44. As will appear, steering of the wheel unit is accomplished by fore and aft pivotal movements of a crank 88 secured to the top of the steering post 82.

Referring to FIGURE 3, right and left subframe means are provided on each side of the vehicle for supporting the operating platform 20 at an elevated position above the wheels and for forming the front and rear wheels on each side of the vehicle into a rigid unitary structure independent of the subframe means mounting the wheels on the other side of the vehicle. Such subframe means includes each of the side support members 44 which are rigidly connected to front and rear lateral arms 90 and 92 which are mounted for movement relative to the end frames 26 and 28, respectively, and laterally of the operating platform 20. In a preferred embodiment, the end frames are provided with inwardly extending supports or shafts 94 for rollers 96, which are suitably received within recessed guides 98 provided on the arms 90 and 92. As will be apparent, this construction permits the support members 44 and wheel units 40, 42 to be moved in a lateral or transverse direction with respect to the operating platform 20.

*Wheel extension means*

The wheel extension and transfer mechanism 45 and 46 (FIGURES 3 and 4) generally function to uniformly extend the front and rear wheels on either side of the vehicle as the vehicle moves in a forward or rear direction during operation.

Referring to FIGURE 3, the extension mechanism generally comprises a hydraulic cylinder 100 which is pivotally attached to the cross frame 30 of the operating platform 20, as indicated at 102. The piston 104 of the extension cylinder is pivotally attached at its opposite end (at 106) to the left hand wheel support member 44. As will appear, the extension cylinder 100 is responsive to actuation of a manual control 108 (positioned on the left hand side of the driver's seat) to extend and retract the wheel units uniformly on either side of the machine. For this purpose, the cylinder 100 is preferably positioned in a forward position on the machine to effect a slightly greater opening pressure on the forward wheel units than the rear wheel units, to insure uniform opening and prevention of unequal or warped extensions of the wheel units. As hereinafter explained, the cylinder 100 is connected into the hydraulic control system in such fashion that it will only operate when the vehicle is in motion, either in a forward or rearward direction. This arrangement prevents undue stresses being placed on the extension mechanisms through accidental manipulation of the control lever in a stopped or standing position of the vehicle.

In the illustrated embodiment, the extension mechanism 45 operates to extend the wheels on both sides of the machine simultaneously. This operation is made possible by a transfer mechanism 46 which transmits the opening or closing forces of the extension cylinder equally to the right and left wheel support members 44.

Referring specifically to FIGURES 6 and 7, the transfer mechanism 46 comprises a transfer chain 110 reeved about sprockets 112 and 114 carried by the respective side frames 22 and 24 of the operating platform, and interconnecting the forward cross arms 90 of the wheel support members 44. As best illustrated in FIGURE 6, the lower reach of the chain 110 is secured to the bracket 116 attached to the left hand cross arm, and the upper reach of the chain is secured to the bracket 118 attached to the right hand cross arm. As will be apparent by reference to FIGURES 3, 6, and 7, a closing operation of the cylinder 100 (retracting piston 104) will cause the left hand cross arm 90 and connection 116 to pull the lower reach of the chain to the right, thereby causing the sprocket 114 to rotate in a counterclockwise direction. Rotation of the sprocket 114, in turn, causes the upper reach of the chain to move connection 118 to the left to retract the right hand cross arm 90 and associated support member 44. In brief, rotation of the sprockets 112 and 114 in a counterclockwise direction causes the chain connections 116, 118 to move the cross arms 90 and attached wheel support members 44 towards one another until they reach the full retracted position illustrated in FIGURE 7.

In like fashion, operation of the cylinder 100 to extend the piston 104 will effect a reverse or clockwise rotation of the sprockets 112, 114 and chain 110 to move the cross arms and wheel support members 44 to a fully extended position. The extent of this opening movement is preferably limited by engagement of a stop member 200 carried by one of the cross arms with a stop plate 202 suitably positioned on the main frame 20.

While it is possible to use two or more extension mechanisms 45, 46, each constructed as above described, a preferred arrangement has been to employ a longitudinal coupling 204 interconnecting the forward chain assembly 110 with a rear chain assembly 210 of substantially identical construction. In the illustrated apparatus, the coupling 204 comprises a simple torsion rod keyed to the forward sprocket 112 and to a corresponding rear sprocket 212. This construction permits rotary movements of the chain assembly 110 to be transmitted through the coupling 204 to the rear chain assembly 210. The latter operates through its connections with the rear cross arms 92 to impart additional opening or closing forces to rear portions of the wheel support members 44.

The chain assemblies 110 and 210 thus cooperate to insure uniform transmission of opening and closing forces to the wheel support members upon operation of the extension mechanism 45.

*The steering means*

The steering mechanism (FIGURES 9 to 13) generally comprises a steering control 50 for the operator and fore and aft steering linkages 48 and 49 on either side of the machine by which each of the wheel units 40 and 42 can be independently steered.

Referring to FIGURES 1 to 4, the steering control 50 comprises the usual conventional steering wheel 220 and support column 222 mounted upon the forward cross frame of the operating platform. Rotational movements of the steering wheel are transmitted to vertically extending cranks 226 and 228 (FIGURES 3, 6, and 9). As best illustrated in FIGURES 4 and 8, the lower end of the steering column 222 is provided with a worm gear 230 which meshes with a pinion gear 231 to rotate the right hand crank 226 in one direction, and which operates through a reversing gear 232 and pinion gear 233 to rotate the left hand crank 228 in the opposite direction. By way of illustration, a right turning motion of the steering wheel 220 (i.e., clockwise) will result in a forward rotation of the crank 226, and a rearward rotation of the crank 228 (see FIGURES 9, 10, and 12), due to the reversed rotation of these cranks with respect to the worm gear 230.

Referring to FIGURES 3 and 6, the cranks 226 and 228 are operatively connected to vertically extending steering levers 236 and 238, respectively, mounted on the forward ends of the support members 44. These connections are preferably in the form of sliding rod and tube assemblies 239 which permit effective transfer of the steering action despite different positions of extension of the support members 44.

The construction of the fore and aft steering linkages 48 and 49 is best shown in FIGURE 1, and in FIGURES 9 to 13. In general each steering linkage is composed of an actuating rod 240 which operates through a double crank lever 242, and through connecting rods 244, 246, to operate steering cranks 88 for the front and rear wheel units 40 and 42. The actuating rods 240 are preferably connected at their rear ends to power cylinders 250 which, in turn, are connected to one of the cranks of the double crank levers 242. As will appear, this construction facilitates use of the hydraulic system to effect power steering in response to manipulation of the steering control 50.

As will be understood by reference to FIGURE 3, each of the steering linkages 48 and 49 is entirely supported by a side support member 44. The mechanisms are centrally supported by stub shaft mountings 252 for the double crank levers 242. The connecting rods 244 and 246 are each supported at one end by the lever 242 and at the opposite end by the steering cranks 88 carried by the wheel units. The actuating rods 240 are similarly supported by the crank 242 and at the opposite end by the steering levers 236 and 238. As previously indicated, the latter are connected to the steering control by means of the slide connections 239.

The general operation of the steering mechanism can best understood by reference to FIGURES 9, 10 and 12. In the position of the parts illustrated, the steering wheel 220 has been turned to effect a right turn, causing a forward rotation of the crank 226 and a rearward rotation of the crank 228 and corresponding movements of the levers 236 and 238. With particular reference to FIGURES 10 and 11, the forward and rear pivotal movements of the steering levers 236 and 238 effect a positioning of the double crank levers 242 (through movement of the actuating rods 240) as illustrated. The net effect is to pivot the horizontal steering crank 88 for the right front wheel unit in a rearward direction and the steering crank for the left wheel unit in a forward direction, thereby effecting a right turning movement of the wheel unit (FIGURE 9). At the same time, the levers 242 effect movement of the right rear crank 88 in a forward direction and the left rear crank 88 in a rearward direction, thereby effecting a left turning movement of the rear wheel units 42. Manipulation of the steering wheel 220 thus effects simultaneous turning of each of the wheel units 40, 42 in a manner which will insure effective tracking of the front and rear wheels.

Referring to FIGURES 11 and 13, it will be seen that forward and rearward pivotal movements of the steering levers 236 and 238 effect a disproportionate steering response in the wheel units on the left and right hand sides of the vehicle. Thus, assuming an equal response of the actuating rods 240 to the pivotal movements of the steering levers 236 and 238 (indicated at X in FIGURES 11 and 13), the forward pivotal movement of the right hand lever 242 produces a steering response in the connecting rods 244 and 246 (indicated at Y in FIGURE 11) which is substantially greater than the steering response of the connecting rods on the left hand side of the vehicle (indicated at Z in FIGURE 13). This unequal steering response at the wheel units is a feature of the construction of the double crank levers 242 and their angular position at the intermediate or neutral steering position, as represented in FIGURE 3. The net result is a greater steering effect upon the inside wheel units than upon the outside wheel units during turns. This result is schematically illustrated in FIGURE 9 which clearly shows that the turning radius $r$ of the inside wheels is substantially less than the radius $r'$ of the outside wheels. It will be understood that the disproportionate steering response on opposite sides of the vehicle is intended to minimize frictional drag on the tires during a turn, and that this function is achieved regardless of whether the vehicle is maneuvered in a right or a left turn.

The optimum angular positions of the steering levers 236 and 238 and the steering cranks 88 depends to some extent upon the track width or upon the degree of extension of the wheel units 42 with respect to the operating platform. Thus, as represented in FIGURE 9, $d$ represents the minimum track width of the vehicle with the wheel units 40, 42 in a retracted position. In like fashion, $d''$ represents the maximum track width of the vehicle with the wheel units in a fully extended position, while $d'$ represents an intermediate track width with the wheels in partially extended position. To insure most effective steering at all positions of extension of the wheel units, the steering levers and cranks are preferably positioned with respect to an intermediate position of the wheels represented at 260, and specifically by intersection of the turning radii $r$, $r'$ with the intermediate track. The indicated positioning of the steering levers and cranks produces substantially uniform tracking characteristics in the vehicle, and a minimum scuffing of the wheels during turns at all positions of extension of the wheel units 40, 42.

Operating platform

In addition to supporting the main propulsion unit 43, operating station 54 and steering control 50, the intermediate cross frames 30 of the operating platform provide a means to support units of farming or like equipment (e.g., chemical treatment tanks, platforms for harvesting crews, spraying or dusting equipment, etc.). As schematically represented at 270 in FIGURE 1, various types of apparatus can be easily suspended beneath the operating platform 20, in the space between the wheel units 40, 42 with suitable controls being positioned adjacent the operator at station 54.

In carrying out operations of the type described, it is frequently desirable that the operating platform be adjustable to different vertical elevations with respect to the ground level 274. One such arrangement for this purpose is shown in FIGURES 15 and 16 and makes use of steering posts 82 of different lengths in combination with extensions 77 of the support posts 76. Such arrangement has proved highly satisfactory where two or more fixed elevations of the operating platform are employed over periods of extended operation ranging up to several weeks.

FIGURES 17 and 18 illustrate a preferred system of support whereby the height of the operating platform 20 can be adjusted at will. As illustrated, the longitudinal support members 44 are supported on the outer posts 276 of vertically extensible pairs of post members 276, 278. The inner posts 278 are nonrotatively connected to the suspension arms 78 and remain in a substantially fixed vertical position relative to the ground. In contrast, the outer posts 276 are free to move up or down to different elevations relative to the ground level in response to hydraulic fluid introduced to the interior of the posts through the hydraulic lines 279. The steering cranks 88 are secured to modified steering posts 282 supported on the outer posts 276 by the bearing mounts 284. At their lower ends the posts 282 are provided with elongated slotted or splined shaft portions which are nonrotatively received in corresponding key ways provided in cross members secured across the inner posts 278.

Figure 14:
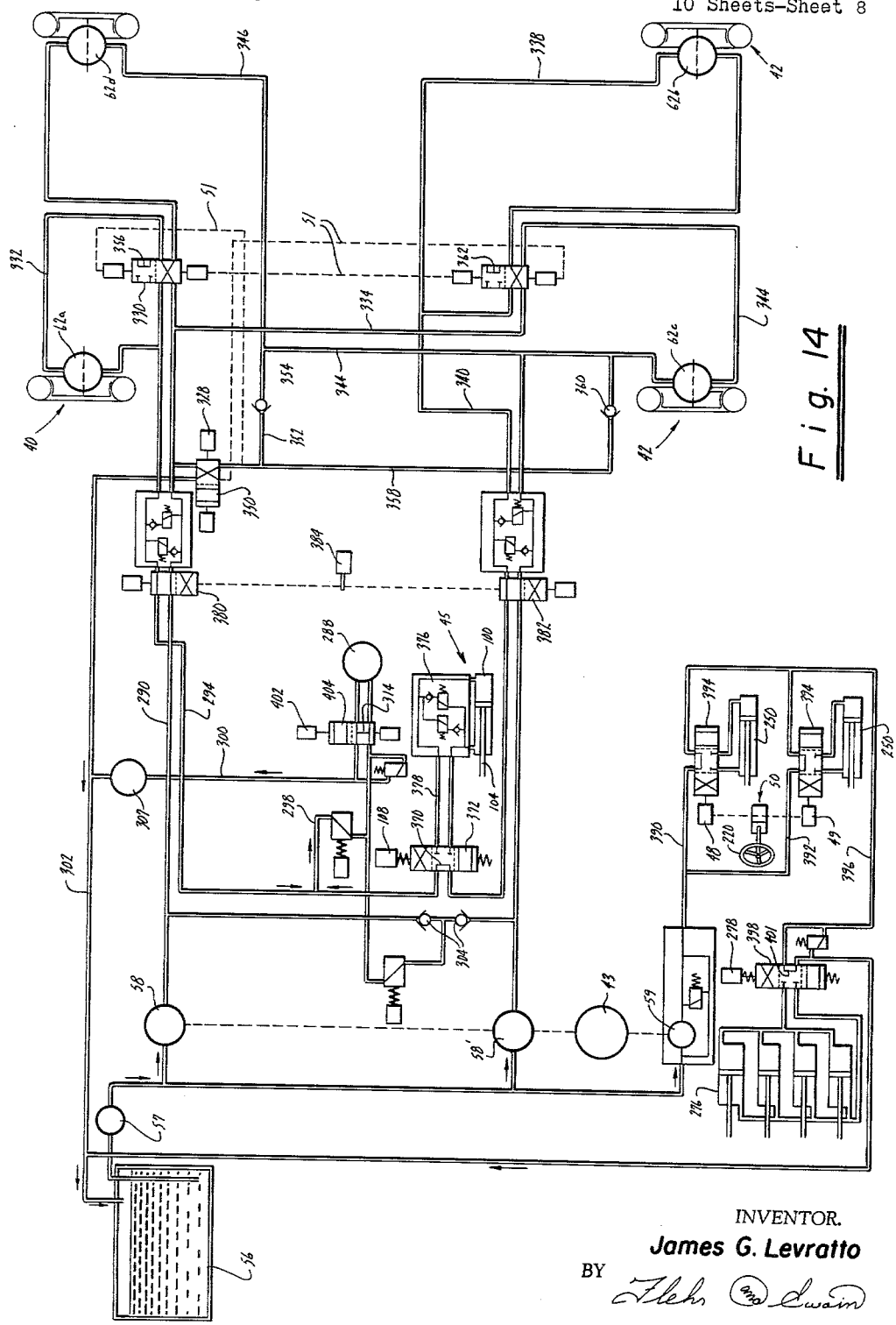
FIGURE 14 is a schematic view of a fluid system for operating and controlling the operation of the machine in accordance with the invention.

As will be understood, the telescoping posts 276, 278 function as lift cylinders which may be operated by a control 280 at the operating station 54 (see FIGURE 14). Steering control is transmitted through this lift cylinder arrangement by means of the nonrotative sliding connection between the steering post extensions 284 and the cross members 286 carried by the inner post members 278. This construction retains the same positive control of the wheel units 40, 42 hereinbefore described, but permits the operator to manipulate the control 280 to raise or lower the operating platform as may be necessary to adjust the platform height to the desired operating level.

Hydraulic system

As previously indicated, the hydraulic system (FIGURE 14) supplies fluid under pressure to the principal drive mechanisms including the wheel extension mechanism 45 and the drive units 47 for the wheels, and also to auxiliary systems such as the power steering and platform elevating mechanisms. As will appear, various units of operating equipment can also be included as components in the hydraulic system.

In the system illustrated, hydraulic fluid is supplied from the tank 56, through filter 57, to two separate hydraulic circuits. The main or drive circuit is supplied by the pumps 58 and 58', and includes the extension cylinder 100 as well as the individual motors 62 for the wheel units. This circuit can also include hydraulic motors or similar power units 288 adapted to use with the operation equipment (e.g., spray equipment, dusting equipment, etc.). An auxiliary circuit, supplied by the pump 59, includes the power steering cylinders 250 and the elevating cylinders 276.

When the pumps 58, 58' are operating to drive the machine, hydraulic fluid is supplied to the drive motors 62 through the separate conduits or feed lines 290, 292, and is returned to the tank 56 through the lines 294 and 296, throttle line 298, and lines 300 and 302. A portion of the discharge from the pumps 58 and 58' also passes through the check vales 304 to the brake line 306, and eventually joins the flow in the throttle line 298 as the latter returns to the tank through lines 300 and 302. The throttle control 308 (right foot pedal in FIGURE 3) functions to vary the return of hydraulic fluid through the throttle valve 310 in line 298. In like fashion, the brake control 312 (left foot pedal in FIGURE 3) functions to vary the return of fluid through a throttle valve 316 in the brake line 306. If desired, the fluid returning to the tank can be subjected to suitable heat exchange (heating or cooling) by the means of a heat exchange unit 318.

Referring to FIGURE 3, the brake pedal 312 is mechanically connected through the levers 320, 321, and connecting rod 323 to a valve actuator at the valve 316. The valve 316 is normally biased to open position by a spring 325, and is closed by depressing the brake pedal 312 against the pressure of the spring. The throttle valve 310 is similarly operated by the foot pedal 308 except that the mechanical linkage (not shown) is constructed to normally bias the valve 310 to a closed position. Depressing the pedal 308 thus effects opening of the valve 310, and induces return flow of hydraulic fluid through the throttle line 298.

In an idling condition of the drive circuit, the discharge from the pumps 58 and 58' returns to the tank 56 through the bypass line 326, check valves 304, brake line 306, and the return line through bypass 314 and lines 300 and 302.

To initiate the operation of driving the machine, the right foot pedal or throttle 308 is depressed to cause flow of hydraulic fluid through the throttle valve 310, and consequently in the return line through the conduit 298, bypass 314, and conduits 300, 302 leading to the tank 56. When it is desired to stop the machine, the throttle valve 308 is released to reduce the return flow through the throttle line 298 and, at the same time, the left foot pedal or brake control valve 312 is depressed to restrict the flow through the bypass line 326 and return line 306. The net effect is to cause the hydraulic fluid in the return lines 294, 296 to back up and thereby stop the drive operation of the motors 62.

In general, the hydraulic system of drive permits each of the hydraulic motors 62 to be operated independently to thereby achieve maximum power, as well as maximum flexibility of use in the field. Thus, in the positions of the valves illustrated in FIGURE 14, the pump 58 operates to separately drive the motors 62 for both the left front wheel unit 40 and the right rear wheel unit 42. In like fashion, the pump 58 operates to separately drive the hydraulic motors for the right front and left rear wheel units. More specifically the pump 58 drives the left front wheel unit 40 through the lines 290, 328, valve 330, line 332, motor 62a, and return line 294. It drives the right rear wheel unit 42 through the branch line 334, valve unit 336, line 338, motor 62b, line 340 and return line 296. In like fashion the pump 58' drives the left rear wheel unit 42 through the lines 292, 342, 344, motor 62c, valve unit 336, line 340, and return line 296. It drives the right front wheel unit 40 through the branch line 344, line 346, motor 62d, valve unit 330, and return line 294. As will be understoood this arrangement provides maximum power through the pumping means 58, 58' to each of the separate wheel units 40, 42.

For use on the highway, it is generally desirable that the drive system function to provide maximum speed rather than power. In the illustrated apparatus this is accomplished by a "high-low" control or shift lever 350 which operates through pilot lines 351 to shift the valves at the valve control units 330 and 336. As will be apparent from FIGURE 14, the control 350 is inoperative in the illustrated "low" position. However, when shifted to the right to the "high" position, it effects a shifting of the valve controls 330 and 336 in a generally downward direction, as viewed in FIGURE 14. The effect of this shifting is to cause the pumps 58, 58' to simultaneously drive all of the motors 62 in series. To illustrate, pump 58 functions to drive the motors in series through the following hydraulic connections: line 290, controller 350, branch line 352, check valve 354, and line 346 to drive the right front motor 62d; through the valve bypass line 356, line 332, and return line 294 to drive the left front motor 62a; through controller 350, branch line 358, check valve 360, and line 344 to drive the left rear motor 62c; through bypass line 362, line 338, and return lines 340 and 296 to drive the right rear motor 62b. In like fashion, the pump 58 drives the left motor 62c through lines 292, 342 and 344; the right rear motor 62b through bypass 362, line 338 and return lines 340 and 296; the right front motor 62d through branch line 344, and line 346; and the left front motor 62a through bypass line 356, line 332 and return line 294.

It will be noted that the extension mechanism 46 is positioned in the return line 296. In the position illustrated in FIGURE 14, the extension mechanism is rendered inoperative by means of the bypass connection 370 in the valve control 372. However, when it is desired to extend the wheels, the control 108 is manipulated to shift the position of the valve 372, thereby admitting hydraulic fluid to one side or other of the extension cylinder 100. Thus, as illustrated in FIGURE 14, movement of the valve control 372 in a downward direction will cause fluid to be admitted to the rear of the cylinder 100 to extend the wheels. Movement of the valve control in an upward direction will cause fluid to be admitted to the forward portion of the cylinder 100 to retract the wheels. In either case, the return line is completed through a check valve and bypass mechanism, generally represented at 376, so that the return line is completed through the branch line 378. In general, this arrangement permits operation of the extension mechanism 45 only when the vehicle is being driven by the pumps 58 and 58', or when fluid is returning through the return line 296. This function is achieved by action of the foot control and throttle valve 308, 310 which restricts the flow in the return line 296 in the raised position of the foot pedal to thereby render the extension mechanism inoperative. However, when the foot pedal 308 is depressed, the flow of hydraulic fluid in the return line 296 permits extension or retraction of the wheels in response to operation of the cylinder 100.

It is further provided that the vehicle can be driven in a forward or a reverse direction. This function is accomplished by suitable control valves 380 and 382 which are coupled to act in unison. As will be apparent to one skilled in this art, shifting of the valves 380, 382 by the control 384 (see FIGURE 3) will effect a reversal of fluid flow through the hydraulic motors 62, thereby reversing the direction of movement of the vehicle.

As has been previously indicated the pump 59 independently operates the power steering and platform elevating mechanisms. As will be apparent from FIGURE 15, the pump 59 is not part of the drive system, but operates independently to supply hydraulic fluid through the lines 390 and 392 to the control valves 394 for the power steering cylinders 250. As previously indicated, the cylinders 250 are actuated in opposite directions by the fore and aft steering linkages 48 and 49 (shown schematically in FIGURE 14) in response to the steering control 50 at the operator's station. The pump 59 also supplies hydraulic fluid, through line 396, to the platform elevating cylinders 276, under the control of the control valve unit 398. The discharge from this unit ultimately returns to the reservoir 56 through the line 400. As will be understood, hydraulic fluid is bypassed through the valve control units 394 in a neutral position of the steering mechanism but is responsive to fore and aft movements of the steering linkages 48, 49 to shift the valves in reverse directions, as hereinbefore explained. This, in turn, effects reverse operations of the cylinders 250 to pivot the double crank levers 242 in opposite directions, depending on the direction of steering imparted to the steering wheel 220 by the operator, thereby effecting steering of the vehicle. In like fashion, the valve 398 is normally bypassed through line 401 until such time as the operator shifts the valve by means of the control 278. As illustrated, downward movement of the valve will retract the cylinders 276, thereby lowering the operating platform 20, whereas upward movement of the valve will extend the cylinders to raise the platform.

So far the description of the hydraulic system has applied to the general operation of the vehicle. Specific units of equipment such as spray motors, pneumatic devices for dusters and the like can be separately operated, for example, by the illustrated hydraulic motor 288. Preferably this motor is operated at such time as the machine is being driven, and therefore is positioned in the drive circuit. Operation of this machine is obtained by manipulation of the control valve 402 to shift the valve controller 404 thereby placing the hydraulic motor 288 in the drive circuit. This arrangement generally provides for operation of the motor 288 and associated operating equipment at such time as the machine is in actual movement in a farming or like operation.

*Operation*

Reviewing briefly the operation of the machine illustrated in the drawings, the machine is placed in use by starting the motor 43 to drive the hydraulic pumps 58, 58' and 59. In an idling position of the machine, the pumps 58, 58' discharge through the bypass line 326 and brake line 306, and return to the tank 56 through the lines 300 and 302. The auxiliary pump 59 discharges through the bypass lines at the control valves 394, 398 and returns to the tank through the line 400.

The machine is started in motion by depressing the right foot pedal 308 to permit the pumps 58 and 58' to discharge through the drive motor feed lines 290 and 292, in addition to the discharge through the bypass line 326, and to return through the lines 298 and 306. It is stopped by releasing the foot pedal 308, and depressing the brake pedal 312, to thereby back up the return through the lines 298 and 306 to resist rotation of the drive motors 62.

During movements of the vehicle, steering is accomplished by the steering wheel 220 which operates through the cranks 226, 228, and the sliding connections 239 with the steering levers 236, 238 to control the fore and aft movements of the steering linkages 48 and 49. The steering linkages effect simultaneous turning of front and rear wheel units 40, 42 on each side of the machine, and insure effective tracking of the wheels, as shown in FIGURE 9. The steering linkages also effect reverse pivotal movements of the double crank levers 242 to produce an unequal steering response of the wheels, and in particular, to produce a greater steering effect upon the inside wheels than on the outside wheels. This effect is illustrated schematically in FIGURE 9 by the shorter turning radius of the inside wheels with respect to the outside wheels.

The height of operating platform 20 can also be varied during movement of the vehicle (in the preferred embodiment shown in FIGURES 17 and 18) by actuating the control 278 to extend or retract the hoist cylinders 276. Alternatively, the height of the platform can be adjusted by mechanical means as illustrated in FIGURES 16 and 17.

It is a particular feature of the invention that the wheels on either side of the machine can be extended as the vehicle moves in a forward or rearward direction during operation. This function is achieved in the illustrated embodiment by the extension mechanism 45, which preferably is positioned in the drive circuit so that the wheels can be extended only when the machine is actually moving. Assuming that the machine is moving in a forward or rearward direction, the wheels are extended by manipulating the control 108 to shift the valve 372 for the extension cylinder 100 (FIGURES 3 and 14). The piston of this cylinder exerts extending or retracting on the left hand wheel support member 44, and through the transfer mechanism 46 (FIGURES 6 and 7) to the right hand wheel support member 44. In the illustrated embodiment, a longitudinal coupling 204 connects the forward chain assembly 110 of the transfer mechanism with a rear chain assembly 210, and permits the opening and closing forces of the transfer mechanism 46 to be transmitted to the rear chain assembly. This arrangement insures that substantially equal opening and closing forces are transmitted to front and rear portions of the wheel support members 44.

In general, the extension and transfer mechanism 45, 46 operate to gently slide the wheel units sideways as the vehicle moves in a forward or rearward direction, with a minimum scuffing effect.

By way of specific example, a medium size machine having an overall length of 160 inches and a normal ground clearance of approximately 72 inches has been successfully employed in various operations in the field. This machine has a normal track width (with the wheels in retracted position) of about 80 inches, and an extended track width of about 120 inches. The operating platform covers an open space between the wheels measuring approximately 135 inches by 96 to 130 inches depending upon the position of extension of the wheels. The machine is powered by a standard tractor engine (155 H.P. gasoline engine) operating a pair of drive pumps and an auxiliary pump (Model X38, manufactured by The Commercial Shearing and Stamping Co. of Youngstown, Ohio) and capable of developing hydraulic pressures ranging up to 3000 p.s.i. The machine develops a ground speed in the "low" gear, ranging up to 8 miles per hour. In the "high" gear, it is capable of speeds ranging up to 15 miles per hour. The machine has an overall weight of approximately 5800 pounds, and is easily handled on the highway under normal operating conditions. It has proved extremely effective in field maneuvers related to row crops, with variations in the track width and platform height being easily accomplished under all normal operating conditions.

It will be evident from the foregoing that my new machine provides a satisfactory mobile vehicle for a wide variety of uses, and particularly farming or similar uses requiring a narrowing or widening of the tread of the vehicle to permit free passage between rows of plants. The machine offers the additional advantage that it is adjustable in height, and is capable of being driven and steered through independent operation of the separate wheels, thereby achieving maximum power and flexibility of operation. My machine offers the further advantage of being highly adaptable to use with a wide variety of equipment, offers extreme adaptability and maneuverability, and demonstrates a capacity for use in a variety of farming operations not possible with prior machines.

To those skilled in the art to which this invention relates, many changes in construction and widely differing embodiments and applications will suggest themselves without departing from the spirit and scope of the invention. For example, although power is supplied to the illustrated apparatus by means of a gasoline hydraulic system, power might also be supplied by equivalent systems employing diesel or electric hydraulic systems, or by similar combinations employing pneumatic control lines. Alternatively, my machine might be employed to mount various types of equipment on top of the operating platform 20, for example, types of aerial harvesting equipment for use in orchards, and the like. These and other variations are considered to be clearly within the skill of one versed in this art, and the disclosures herein are consequently intended as purely illustrative and not in any sense limiting.

I claim:

1. In a wheeled farm vehicle of the type adapted to straddle row crops and including front and rear wheels disposed on the sides of the vehicle, drive means for at least one of the wheels, an operating platform, left and right subfame means for supporting said platform at an elevated position above said wheels for movement therewith and for independently forming the front and rear wheels on each side of the vehicle into rigid unitary structures, each of said subframe means mounted for lateral movement as a unit with respect to the vehicle so that the front and rear wheels on each respective side of the vehicle can be simultaneously moved sideways an equal amount with respect to the vehicles, and a steering linkage operatively carrier by each subframe, said left linkage steerably connecting left front and left rear wheels, said right linkages steerably connecting right front and right rear wheels, a steering control connected to both said left and right steering linkages, said steering linkages including double crank lever means, said steering linkages responsive to said steering control to effect a smaller turning radius of front and rear wheels positioned on the vehicle during a turning operation.

2. In a wheeled vehicle of a type adapted to use in farming operations, left and right subframe means, each of said subframe means being mounted on a pair of cooperating front and rear wheel units, drive means for said wheel units, an operating platform carried by said subframe means at an elevated position with respect to said wheel units, said subframe means being movably connected to the platform to permit lateral movements of the subframe means with respect to said platform, steering means including a steering linkage carried by each subframe means and connected to each of the cooperating front and rear wheel units associated with said subframe means, means operable during movement of said vehicle to cause at least one of said subframe means to move transversely of said platform to thereby extend at least one of said pair of front and rear wheel units, and a steering control on said platform provided with a sliding connection with said steering linkages whereby effective steering control is possible at any position of extension of said subframe means, said steering linkages being provided with double crank lever means responsive to said steering control to effect a smaller turning radius of front and rear wheel units positioned on the inside of the vehicle during a turning operation.

3. In a wheeled vehicle of a type adapted to use in farming operations, left and right subframe means, each of said subframe means being mounted on a pair of cooperating front and rear wheel units, drive means for said wheel units, an operating platform carried by said subframe means at an elevated position with respect to said wheel units, each of said subframe means being provided with inwardly directed cross arms, said operating platform and cross arms being provided with cooperating guide means including rollers to facilitate lateral movements of said subframe members with respect to said platform with minimum frictional resistance, steering means including a steering linkage carried by each subframe means and connected to each of the cooperating front and rear wheel units associated with said subframe means, means operable during movement of said vehicle to cause at least one of said subframe means to move transversely of said platform to thereby extend at least one of said pair of front and rear wheel units, and a steering control on said platform provided with a sliding connection with said steering linkages whereby effective steering control is possible at any position of extension of said subframe means.

4. In a wheeled vehicle of a type adapted to use in farming operations, left and right subframe means each having cross arms, each of said subframe means being mounted on a pair of cooperating front and rear wheel units, drive means for said wheel units, an operating platform carried by said subframe means at an elevated position with respect to said wheel units, a transfer mechanism connecting the cross arms of said left and right subframe means to effect simultaneous, substantially symmetrical lateral movements of said subframe means during operaiton of said means to extend said subframe means, steering means including a steering linkage carried by each subframe means and connected to each of the cooperating front and rear wheel units associated with said subframe means, and a steering control on said platform provided with a sliding connection with said steering linkages whereby effective steering control is possible at any position of extension of said subframe means.

References Cited by the Examiner

UNITED STATES PATENTS

| | | | |
|---|---|---|---|
| 1,143,475 | 6/1915 | Wise. | |
| 2,191,211 | 2/1940 | Krotz. | |
| 2,692,143 | 10/1954 | Rando | 180—1 X |
| 2,729,196 | 1/1956 | Breitenbach | 280—43 X |
| 2,872,991 | 2/1959 | Collins | 180—45 X |
| 2,983,327 | 5/1961 | Hult | 180—1 |
| 2,994,392 | 8/1961 | Kosman | 180—45 |
| 3,053,404 | 9/1962 | Beck | 180—45 X |
| 3,120,398 | 2/1964 | Butterworth | 180—1 X |

FOREIGN PATENTS

| | | |
|---|---|---|
| 1,234,819 | 5/1960 | France. |

A. HARRY LEVY, *Primary Examiner.*